H. A. RICHARDS.
RAILWAY TRAIN REFLECTOR.

No. 184,050. Patented Nov. 7, 1876.

WITNESSES:
Julius Wilcke
N. H. Sherburne

INVENTOR:
Henry A. Richards
By Gridley & Sherburne
Attys

UNITED STATES PATENT OFFICE.

HENRY A. RICHARDS, OF CHICAGO, ILL., ASSIGNOR TO E. S. RICHARDS, OF SAME PLACE.

IMPROVEMENT IN RAILWAY-TRAIN REFLECTORS.

Specification forming part of Letters Patent No. 184,050, dated November 7, 1876; application filed August 3, 1876.

*To all whom it may concern:*

Be it known that I, HENRY A. RICHARDS, of Chicago, in the county of Cook and State of Illinois, have invented certain new and useful Improvements in Railway-Train Reflectors; and I do hereby declare the following to be a full, clear, and exact description thereof, which will enable others skilled in the art to which my invention appertains to make and use the same, reference being had to the accompanying drawing, forming part of this specification, in which—

Figure 1:
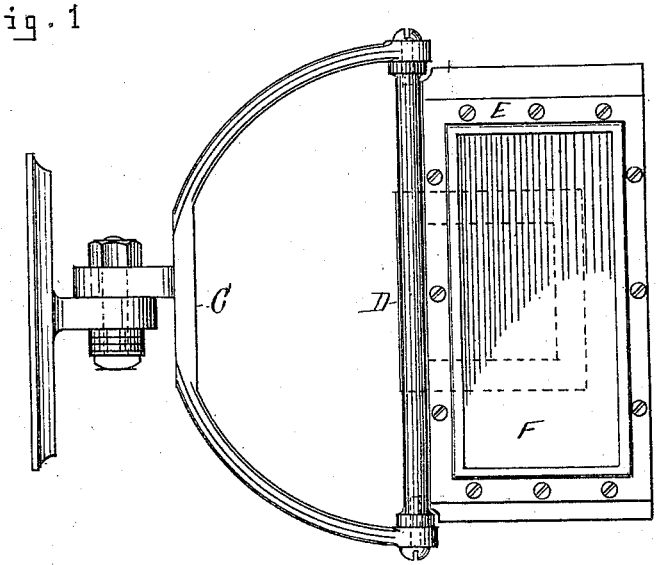
Figure 2:
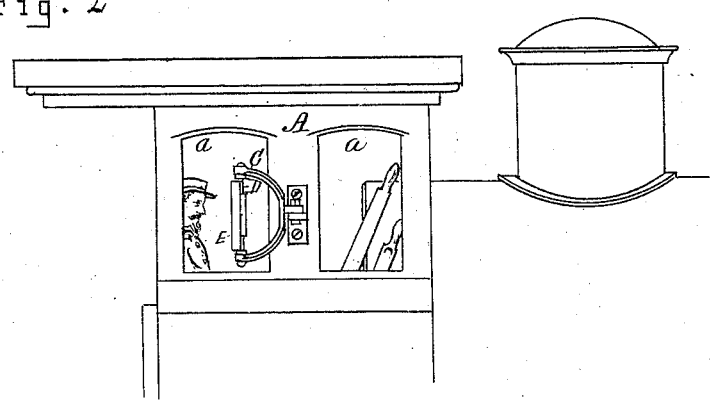

Figure 1 represents a side elevation of a railway-train reflector, embodying my said invention; and Fig. 2 represents a side elevation of a railway-locomotive cab, showing the position of the reflector when in use.

Like letters of reference indicate like parts.

The object of my invention is to provide a reflector which will enable the engineer to see the side of each car in the train and also the track in the rear of the train at the same time; and my invention consists in the arrangement of the several parts of the reflector, as is hereinafter more fully described and claimed.

In the drawing, A represents the cab of a railway-locomotive of the usual construction. C represents an arc-shaped piece of metal forming the reflector-holder, which is hinged at its center to the side of the cab, between the windows *a a*, as shown in Fig. 2, and is so arranged as to admit of being turned upon its hinge forward or backward, to any desired angle to the plane of the side of the cab. D represents a vertical shaft, journaled to and between the ends of the arc C, and is so adjusted as to admit of being turned upon its journals when desired. E represents a wood or metal plate, which is permanently attached to the shaft D, and so arranged as to turn with said shaft. F represents the reflecting-glass which is permanently attached to the plate E, as shown in Fig. 1. The arrangement of these parts is such that by hinging the arc to the side of the cab the reflecting-glass can be readily adjusted to the required angle, so as to enable the engineer to see the side of each car in the train, and, also, at the same time the track in the rear of the train, by looking through the window of the cab into the reflecting-glass, and, when not in use, can be readily folded back against the side of the cab, so as to prevent the glass from being broken.

I am aware that railway-train reflectors attached to the roof of the cab, and acting in conjunction with a deflecting-glass located within the cab, have been used. I am also aware that a mirror has been attached to one or both sides of the cab of the engine; but I do not claim such broadly.

Having thus described my invention, what I claim as new, and desire to secure by Letters Patent, is—

In a railway-train reflector, the hinged and arc-shaped reflector-holder C, shaft D, plate E, and reflecting-glass F, all arranged to operate substantially as and for the purpose specified.

HENRY A. RICHARDS.

Witnesses:
N. C. GRIDLEY,
N. H. SHERBURNE.